No. 871,930. PATENTED NOV. 26, 1907.
G. & E. HAGSTROM.
PATCH FOR PNEUMATIC TIRES.
APPLICATION FILED SEPT. 24, 1906.
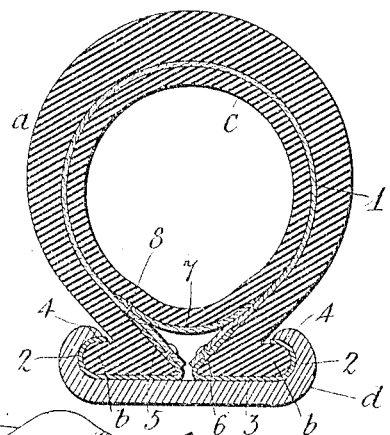
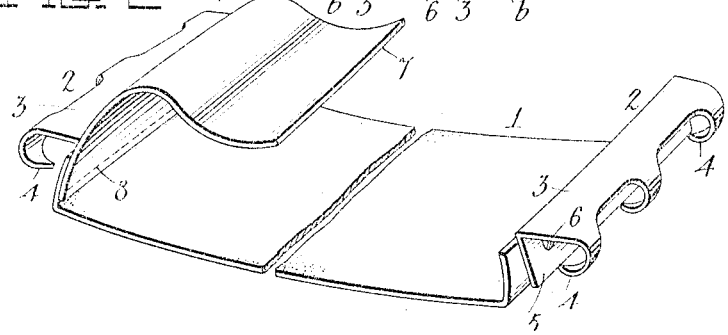
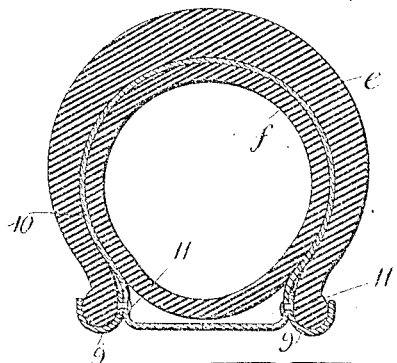
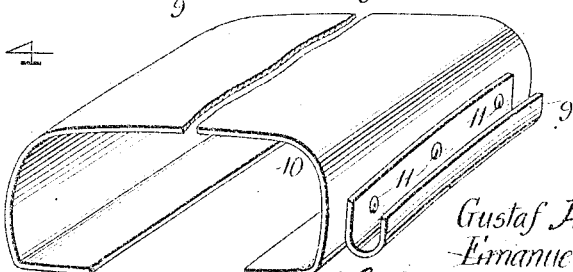
Witnesses
Inventors
Gustaf Hagstrom and
Emanuel Hagstrom
by
Attorneys

UNITED STATES PATENT OFFICE.

GUSTAF HAGSTROM AND EMANUEL HAGSTROM, OF LINDSBORG, KANSAS, ASSIGNORS TO THE HAGSTROM BROS. MANUFACTURING COMPANY, OF LINDSBORG, KANSAS.

PATCH FOR PNEUMATIC TIRES.

No. 871,930.   Specification of Letters Patent.   Patented Nov. 26, 1907.

Application filed September 24, 1906. Serial No. 335,943.

*To all whom it may concern:*

Be it known that we, GUSTAF HAGSTROM and EMANUEL HAGSTROM, citizens of the United States, residing at Lindsborg, in the county of McPherson and State of Kansas, have invented certain new and useful Improvements in Patches for Pneumatic Tires; and we do declare the following to be a full, clear, and exact description of the invention, such as will enable others skilled in the art to which it appertains to make and use the same.

Our invention is an improved patch for repairing pneumatic tires, such as are used on the wheels of automobiles and other vehicles, and it consists in the construction, and arrangement of devices hereinafter described and claimed.

The object of our invention is to provide an improved patch for use between the inner and outer tubes of pneumatic tires for repairing blow-outs and for use in cases in which the outer tube or casing has become broken or injured.

In the accompanying drawings,—Figure 1 is a transverse sectional view of a pneumatic tire provided with our improved patch Fig. 2 is a perspective view of the patch, showing the same extended; Fig. 3 is a transverse sectional view of another form of pneumatic tire provided with a modified form of our improved patch; and Fig. 4 is a perspective view of such modified form of patch;

Our improved patch is a band of leather, rawhide, or other suitable tough and flexible material, to be passed around the inner tube of the tire, between said inner tube and the outer tube or casing, and clips secured to such band, at or near the ends thereof, to secure the patch firmly to the side flanges of the outer tube or casing.

Referring particularly to the form of our invention shown in Figs. 1 and 2, the band or patch 1 is of oblong rectangular form, of suitable length and breadth, and is provided at its ends with clips 2. The said clips are made of suitable sheet metal, are V-shaped in transverse section and have their bottom or outer webs 3 curved longitudinally to correspond with the radius of the tire and are provided at their outer edges with tongues 4, which may be bent around the flanges $b$ of the outer tube or casing $a$, to secure the patch in place in said outer tube.

The ends of the patch are secured to the inner webs 5 of the clips by rivets or other suitable fastening devices 6. A flap 7, which forms an extension of one end of the patch, is secured thereto, near said end, by stitching, as at 8. It may, however, be otherwise secured, and we do not desire to limit ourselves in this particular. The said flap extends between the inner tube $c$ and the metal tire $d$, and covers the space between the ends of the band or patch 1. The inflation of the inner tube causes the patch to be drawn tightly around the same, and together with the pressure of the tire on the clips, keeps the patch in place.

In the form of our invention shown in Figs. 3 and 4, the clips 9 are made of spring sheet metal, are U-shaped in cross-section, and are secured to the patch 10 near the ends thereof by means of rivets or other suitable fastening devices 11. These clips are engaged with the edges of the outer tube or casing $e$ and by their own resiliency retain their grip thereon, the patch being tightened and exerting constant tension on the inner webs of the said clips by reason of the inflation of the inner tube $f$.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described my invention, what I claim as new, and desire to secure by Letters-Patent, is,—

1. A patch of the class described comprising a band to go around an inner tube having clips at its ends to engage the edges of an outer tube and provided with a flap forming an extension of one end to lie between the inner tube and a wheel rim, substantially as described.

2. A patch of the class described comprising a band to go around an inner tube and having clips at its ends to engage the edges of an outer tube, said clips being V-shaped in cross section and the outer webs thereof having tongues to be bent around the flanges at the edges of said outer tube, substantially as described.

In testimony whereof we have hereunto set our hands in presence of two subscribing witnesses.

GUSTAF HAGSTROM.
EMANUEL HAGSTROM.

Witnesses:
EDWARD F. NELSON,
ANDREW BENGTSON.